(12) United States Patent
Nishii

(10) Patent No.: US 12,259,736 B2
(45) Date of Patent: Mar. 25, 2025

(54) WORK SCREEN DISPLAY SYSTEM

(71) Applicant: YANMAR POWER TECHNOLOGY CO., LTD., Osaka (JP)

(72) Inventor: Yasuto Nishii, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 18/409,107

(22) Filed: Jan. 10, 2024

(65) Prior Publication Data

US 2024/0157874 A1    May 16, 2024

Related U.S. Application Data

(63) Continuation of application No. 17/871,240, filed on Jul. 22, 2022, now Pat. No. 11,919,448, which is a
(Continued)

(30) Foreign Application Priority Data

Mar. 3, 2017  (JP) .................................. 2017-040433

(51) Int. Cl.
*A01B 69/04*    (2006.01)
*A01B 79/00*    (2006.01)
(Continued)

(52) U.S. Cl.
CPC ......... *G05D 1/2245* (2024.01); *A01B 69/008* (2013.01); *A01B 79/005* (2013.01);
(Continued)

(58) Field of Classification Search
CPC .... G05D 1/2245; G05D 1/228; G05D 1/0088; A01B 69/008; A01B 79/005; B60R 1/00;
(Continued)

(56) References Cited

U.S. PATENT DOCUMENTS 6,085,135 A * 7/2000 Steckel ................ G09B 29/106
340/988
7,135,994 B2   11/2006 Kamikawa et al.
(Continued)

FOREIGN PATENT DOCUMENTS

JP      10-066403 A    3/1998
JP      2002-182741 A  6/2002
(Continued)

OTHER PUBLICATIONS

International Search Report dated Apr. 3, 2018 issued in corresponding PCT Application PCT/JP2018/001576.

*Primary Examiner* — Gertrude Arthur Jeanglaude
(74) *Attorney, Agent, or Firm* — NORTON ROSE FULBRIGHT US LLP

(57) ABSTRACT

A work screen display system including a position information obtaining unit for obtaining position information on a work vehicle based on positioning correction information supplied from a first reference station; a region shape determination unit for determining a shape of a specific region where the work vehicle performs autonomous travel, based on positioning correction information supplied from a second reference station; and a display control unit for displaying, on a display unit, a specific region indication section indicating the specific region determined by the region shape determination unit. The display control unit displays the specific region indication section in a display mode that varies between a case where the first and second reference stations are identical and a case where the first and second reference stations are not identical.

14 Claims, 8 Drawing Sheets

Related U.S. Application Data continuation of application No. 16/490,461, filed as application No. PCT/JP2018/001576 on Jan. 19, 2018, now Pat. No. 11,420,560.

(51) Int. Cl.

| | | |
|---|---|---|
| *G05D 1/00* | (2006.01) | |
| *G05D 1/224* | (2024.01) | |
| *G05D 1/228* | (2024.01) | |
| *G06F 3/0482* | (2013.01) | |
| *G06F 3/04845* | (2022.01) | |
| *G06F 3/04847* | (2022.01) | |
| *G06F 3/14* | (2006.01) | |

(52) U.S. Cl.
CPC ........... *G05D 1/0088* (2013.01); *G05D 1/228* (2024.01); *G06F 3/0482* (2013.01); *G06F 3/04845* (2013.01); *G06F 3/04847* (2013.01); *G06F 3/14* (2013.01); *B60R 2300/207* (2013.01); *B60R 2300/301* (2013.01); *B60R 2300/302* (2013.01); *B60R 2300/404* (2013.01); *B60R 2300/50* (2013.01)

(58) Field of Classification Search
CPC ........ B60R 2300/207; B60R 2300/301; B60R 2300/302; B60R 2300/404; B60R 2300/50; G06F 3/0482; G06F 3/04845; G06F 3/4847; G06F 3/14
See application file for complete search history.

(56) References Cited

U.S. PATENT DOCUMENTS

| | | | |
|---|---|---|---|
| 7,966,563 B2 * | 6/2011 | VanBree | G06T 7/80 |
| | | | 715/713 |
| 8,095,248 B2 | 1/2012 | Rottig et al. | |
| 10,990,245 B2 | 4/2021 | Marsolek | |
| 11,919,448 B2 * | 3/2024 | Nishii | G05D 1/0044 |
| 2005/0210415 A1 * | 9/2005 | Bree | G06T 5/50 |
| | | | 715/848 |
| 2008/0259097 A1 | 10/2008 | Hara | |
| 2011/0043539 A1 * | 2/2011 | Hiroki | G01C 21/367 |
| | | | 345/661 |
| 2013/0158773 A1 | 6/2013 | Wu et al. | |
| 2014/0347483 A1 | 11/2014 | Nakanishi et al. | |
| 2019/0227561 A1 | 7/2019 | Hiramatsu | |

FOREIGN PATENT DOCUMENTS

| | | |
|---|---|---|
| JP | 2004-350545 A | 12/2004 |
| JP | 2011-254704 A | 12/2011 |
| WO | 2015/119263 A1 | 8/2015 |

* cited by examiner

WORK SCREEN DISPLAY SYSTEM

CROSS REFERENCE TO RELATED APPLICATIONS

This application is a continuation of U.S. patent application Ser. No. 17/871,240 filed Jul. 22, 2022, which is a continuation of U.S. patent application Ser. No. 16/490,461 filed Aug. 30, 2019 (now U.S. Pat. No. 11,420,560), which is a national stage application under 35 U.S.C. § 371 of International Pat. App. No. PCT/JP2018/001576 filed Jan. 19, 2018, which claims priority under 35 U.S.C. § 119 to JP Pat. App. No. 2017-040433 filed Mar. 3, 2017, the disclosures of each disclosure are hereby incorporated by reference in their entireties.

TECHNICAL FIELD

The present invention relates to a work screen display system for displaying a display screen on a display unit when a work vehicle is caused to perform autonomous travel.

BACKGROUND ART

The work screen display system as those described above is used in an autonomous travel system configured to cause a work vehicle to perform autonomous travel (see, e.g., WO2015/119263 ("PTL 1"). A system disclosed in PTL 1 includes a radio communication terminal such as a tablet terminal and a work vehicle capable of performing autonomous travel. With this system, a user can operate the radio communication terminal to give the work vehicle various instructions, such as an instruction to start autonomous travel, to perform autonomous travel. The radio communication terminal includes a display unit such as a display. The display unit includes a screen on which an operation section indicating the state of the work vehicle and operation sections used to give various instructions are displayed, for example.

When autonomous travel is performed, the user operates the radio communication terminal while observing the display screen of the display unit not only before but also after autonomous travel is started. Here, the system disclosed in PTL 1 displays, on the display unit, a display screen showing, e.g., an operation section indicating the state of the work vehicle and operation sections used to give various instructions. However, PTL 1 does not describe details of the display screen. Thus, it is desired to display, on a display unit, a display screen with excellent operability for the user when the work vehicle is caused to perform autonomous travel.

In view of the actual circumstances described above, a main object of the present invention is to provide a work screen display system capable of displaying, on a display unit, a display screen with excellent operability for the user.

SUMMARY OF INVENTION

According to a first aspect, the present invention includes: a position information obtaining unit configured to obtain position information on a work vehicle based on positioning correction information supplied from a first reference station; a region shape determination unit configured to determine a shape of a specific region where the work vehicle is caused to perform autonomous travel, based on positioning correction information supplied from a second reference station; and a display control unit configured to display, on a display unit, a specific region indication section indicating the specific region determined by the region shape determination unit, wherein the display control unit displays the specific region indication section in a display mode that varies between a case where the first reference station and the second reference station are identical to each other and a case where the first reference station and the second reference station are not identical to each other.

According to the above configuration, the display control unit displays, on the display unit, the specific region indication section indicating the specific region. Namely, the specific region indication section possesses the position information obtained based on the positioning correction information supplied from the second reference station. Meanwhile, the position information obtaining unit obtains the position information on the work vehicle based on the positioning correction information supplied from the first reference station. Thus, in a case where the first reference station and the second reference station are not identical to each other, the pieces of positioning correction information obtained therefrom are different from each other, and therefore a deviation may potentially occur between the position of the specific region indication section and the position of the work vehicle potentially. In order to deal with this, the display control unit displays the specific region indication section in a display mode that varies between a case where the first reference station and the second reference station are identical to each other and a case where the first reference station and the second reference station are not identical to each other. With this, by checking the display mode of the specific region indication section, the user can easily determine whether a deviation may potentially occur between the position of the specific region indication section and the position of the work vehicle. Thus, the user can easily determine the specific region to perform autonomous travel, and consequently the user can easily and appropriately select the specific region, for example. Thus, the above configuration can display, on the display unit, the display screen with excellent operability for the user before start of autonomous travel.

A second aspect of the present invention has the following feature. That is, the display control unit displays the specific region indication section in a selectable manner either in the case where the first reference station and the second reference station are identical to each other or in the case where the first reference station and the second reference station are not identical to each other, and the display control unit is capable of displaying identification information on at least the second reference station in a case where the specific region indication section is selected.

According to the above configuration, when the specific region indication section is selected, the display control unit can display the identification information on at least the second reference station having been used to determine the shape of the specific region. Thus, from the identification information, the user can easily figure out which reference station was used as the second reference station. Consequently, the user can determine to which reference station the first reference station should be changed in order to make the first reference station and the second reference station identical to each other, and the user can perform operation, work, and/or the like for this purpose.

According to a third aspect, the present invention includes: a position information obtaining unit configured to obtain position information on a work vehicle based on positioning correction information supplied from a first reference station; a region shape determination unit configured to determine a shape of a specific region where the work vehicle is caused to perform autonomous travel, based on positioning correction information supplied from a second reference station; and a display control unit configured to display a map image on a display unit, wherein the display control unit is capable of controlling a display magnification of the map image in accordance with operation on a specific operation section, in a first display state where the specific region having been determined is displayed on the display unit, the display control unit controls the display magnification of the map image based on the specific region, in a second display state where a travel trajectory of the work vehicle obtained before the determination of the specific region is displayed on the display unit, the display control unit controls the display magnification of the map image based on the travel trajectory, and in a third display state that is not the first display state or the second display state, the display control unit displays the map image at a fixed display magnification.

According to this configuration, by operating a certain operation section, the user can switch the display state between the first display state, the second display state, and the third display state. In the third display state that is not the first display state or the second display state, the display control unit displays the map image at a fixed display magnification. Thus, the user can view the map image at the fixed display magnification, and can check the map information in a stable manner.

On the other hand, the first display state is for displaying the specific region. Thus, in the first display state, the display control unit controls the display magnification of the map image based on the specific region, e.g., based on the size and/or shape of the specific region. This facilitates user's observation of the specific region, and also helps the user appropriately perform operation regarding the specific region displayed on the display unit. Meanwhile, the second display state is for displaying the travel trajectory of the work vehicle. Thus, in the second display state, the display control unit controls the display magnification of the map image based on the travel trajectory of the work vehicle. This facilitates user's observation of traveling of the work vehicle, and also helps the user perform appropriate operation regarding the travel trajectory displayed on the display unit.

A fourth aspect of the present invention is as follows. That is, in the first display state, the display control unit displays the map image on the display unit such that the map image is centered on the centroid of the specific region, and, in the second display state, the display control unit displays the map image on the display unit such that the map image is centered on the centroid of the travel trajectory.

According to the above configuration, in the first display state, the display control unit displays the map image on the display unit such that the map image is centered on the centroid of the specific region. This facilitates user's observation of the specific region, that is, provides the map image showing the specific region in an easy-to-view manner. In the second display state, the display control unit displays the map image on the display unit such that the map image is centered on the centroid of the travel trajectory. This facilitates user's observation of the travel trajectory of the work vehicle, that is, provides the map image showing the travel trajectory in an easy-to-view manner.

A fifth aspect of the present invention is as follows. That is, the display control unit is capable of displaying a magnified view of the map image in response to operation on a magnifying operation section used to magnify the map image, and the display control unit hides, in the case where the magnifying operation section is operated, at least one of operation sections that is not the magnifying operation section.

According to this configuration, when the magnifying operation section is operated, the display control unit hides at least one of the operation sections that is not the magnifying operation section. With this, the user can easily notice that the magnifying operation section has been operated. Also, this configuration can prevent the situation in which the operation section to be hidden is operated and the magnified state of the map image is changed.

A sixth aspect of the present invention is as follows. That is, the display control unit displays the operation section having been hidden and the magnifying operation section, in a case where the magnifying operation section is operated after at least one of the operation sections that is not the magnifying operation section is hidden.

According to this configuration, when the magnifying operation section is operated after at least one of the operation sections that is not the magnifying operation section is hidden, the display control unit displays the operation section having been hidden and the magnifying operation section. Thus, from the situation in which the operation section having been hidden is displayed again, the user can easily notice that the magnification of the map image caused by operation on the magnifying operation section has been cancelled. In addition, since the operation section having been hidden is displayed again, it is possible to operate the operation section thus displayed to change the state of the map image.

A seventh aspect of the present invention is as follows. That is, the display control unit stores a display setting on the map image applied prior to the hiding of at least one of the operation sections that is not the magnifying operation section, and the display control unit displays, in response to operation on the magnifying operation section performed after the storing of the display setting, the map image according to the display setting.

According to the above configuration, in response to operation on the magnifying operation section performed after at least one of the operation sections that is not the magnifying operation section is hidden, the display control unit displays the map image according to the display setting that is stored. Consequently, the screen can easily return to the map image that was displayed prior to the operation on the magnifying operation section. This provides display with an excellent operability for the user.

According to an eighth aspect, the present invention includes: a position information obtaining unit configured to obtain position information on a work vehicle based on positioning correction information supplied from a reference station; and a display control unit capable of providing a predetermined history indication on a travel route displayed on a display unit based on a travel trajectory of the work vehicle on the travel route formed in a specific region, wherein the display control unit provides the history indication in a history indication mode that is either of a first history indication mode in which the history indication is provided based on work state information indicating a work state of the work vehicle and having been obtained from the work vehicle and a second history indication mode in which the history indication is provided not based on the work state information.

According to the above configuration, in the first history indication mode, the display control unit can automatically perform history indication based on the work state information. In the second history indication mode, the display control unit can perform history indication not based on the work state information but in accordance with user's manual operation, for example. Thus, the display control unit performs either of the first history indication mode and the second history indication mode, so as to provide the history indication appropriately and flexibly in accordance with changes in, e.g., the states of the work vehicle.

A ninth aspect of the present invention has the following feature. That is, the present invention further includes a recording control unit configured to record, in a memory unit, the history indication displayed by the display control unit, wherein the recording control unit is capable of automatically recording, in the memory unit, the history indication after a predetermined period of time has elapsed since the history indication is started by the display control unit, and the recording control unit is capable of recording, in the memory unit, the history indication in response to operation on the record instruction operation section displayed on the display unit.

According to this configuration, since the recording control unit automatically records, in the memory unit, the history indication after a predetermined period of time has elapsed since the history indication is started, it is possible to suppress or reduce the possibility that the history indication continues for a long period, thereby making it possible to prevent shortage of a storage capacity, reduction in a processing speed, and the like. In addition, the recording control unit can record the history indication in the memory unit in response to operation on the record instruction operation section displayed on the display unit. Thus, by operating the record instruction operation section, the user can record the history indication in the memory unit at the timing at which the user wishes to perform the recording. Thus, the recording of the history indication in the memory unit can be performed not only automatically but also in accordance with user's manual operation. This enables flexible operation, thereby making it possible to improve the operability.

A tenth aspect of the present invention has the following feature. That is, the display control unit is provided to a radio communication terminal capable of performing radio communication with the work vehicle, the display control unit is capable of displaying a plurality of screens including a setting screen used to perform setting on autonomous travel of the work vehicle and a work screen via which instructions to start and stop autonomous travel of the work vehicle are allowed to be given, the work vehicle is operable in a desired one of a plurality of modes including a normal autonomous travel mode of performing the setting on autonomous travel via the setting screen of the radio communication terminal and allowing the work vehicle to start autonomous travel in response to an instruction to start autonomous travel given through the work screen and an autonomous travel preparation mode of allowing the work vehicle to start autonomous travel in response to an instruction to start autonomous travel given through the work screen, without performing the setting on autonomous travel via the setting screen of the radio communication terminal, and the display control unit displays the setting screen prior to display of the work screen in a case where the work vehicle is in the normal autonomous travel mode, whereas the display control unit displays the work screen without displaying the setting screen in a case where the work vehicle is in the autonomous travel preparation mode.

According to the above configuration, while the work vehicle is in the normal autonomous travel mode, the setting screen is displayed prior to display of the work screen. Consequently, it is possible to perform various settings via the setting screen, and to perform autonomous travel in accordance with the setting thus set. Meanwhile, while the work vehicle is in the autonomous travel preparation mode, the display control unit displays the work screen without displaying the setting screen. Consequently, it is possible to start autonomous travel without performing the setting on autonomous travel via the setting screen. Thanks to omission of displaying of the setting screen, it is possible to start autonomous travel smoothly.

DESCRIPTION OF EMBODIMENTS

With reference to the drawings, the following will describe an embodiment of an autonomous travel system including a work screen display system according to the present invention.

Figure 1:
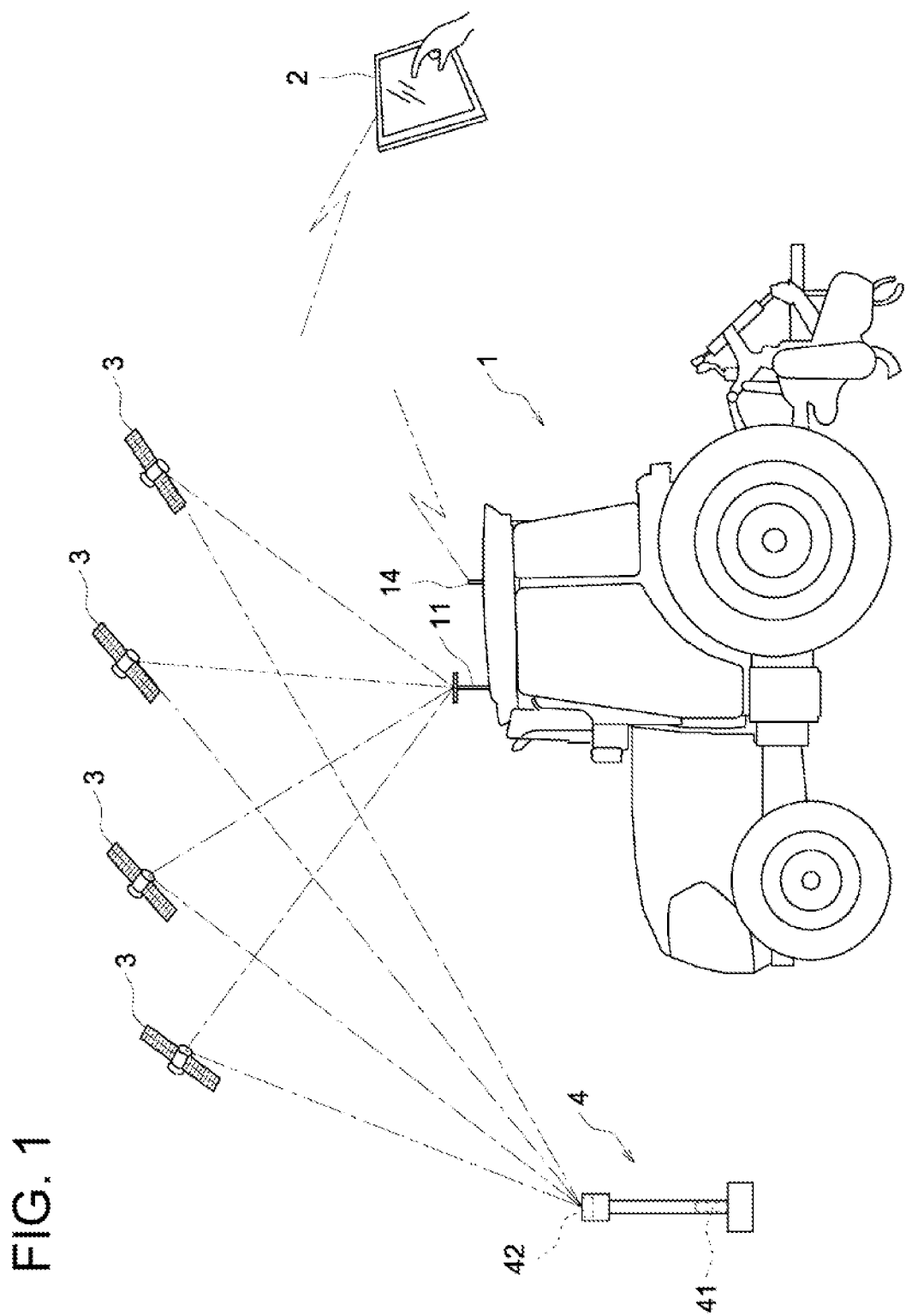
FIG. 1 is a view illustrating a schematic configuration of an autonomous travel system.

As illustrated in FIG. 1, the autonomous travel system includes a tractor 1 that is a work vehicle configured to perform autonomous travel along a predefined travel route and a radio communication terminal 2 with which instructions regarding various kinds of information can be given to the tractor 1. In the present embodiment, the autonomous travel system further includes a reference station 4 capable of transmitting positioning correction information to the tractor 1 in order to obtain position information of the tractor 1.

FIG. 1 shows the tractor 1 as one example of the work vehicle. Instead of the tractor, the work vehicle may be a riding-type working machine such as a rice transplanter, a combine harvester, a civil engineering and construction work machine, and a snowplow, or a walking-type work machine.

Figure 2:
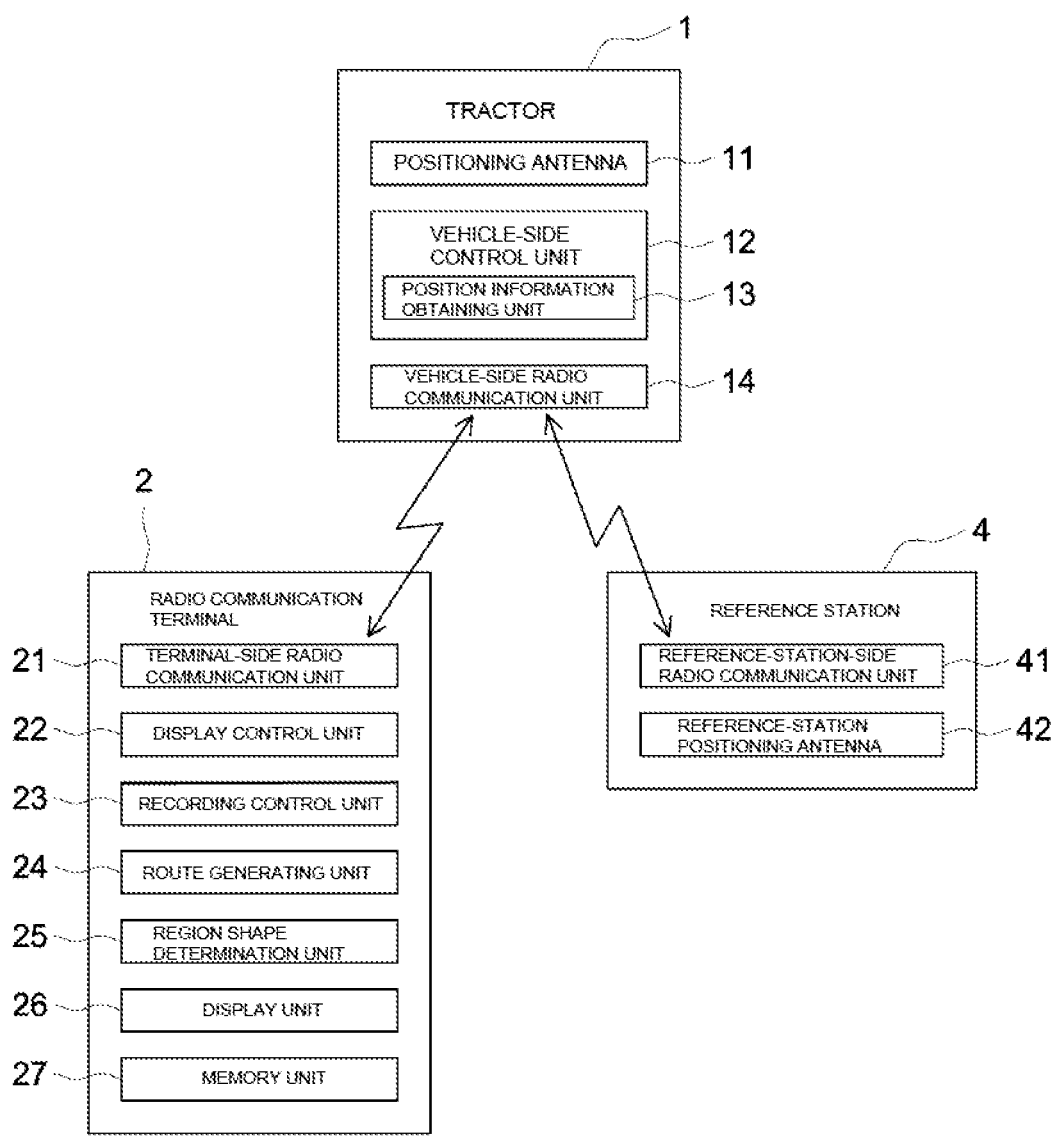
FIG. 2 is a block diagram illustrating a schematic configuration of the autonomous travel system.

As illustrated in FIG. 2, the tractor 1 includes a vehicle-side radio communication unit 14, the radio communication terminal 2 includes a terminal-side radio communication unit 21, and the reference station 4 includes a reference-station-side radio communication unit 41. The tractor 1 and the radio communication terminal 2 are configured to be capable of exchanging various kinds of information with each other through radio communication between the vehicle-side radio communication unit 14 and the terminal-side radio communication unit 21, and the tractor 1 and the reference station 4 are configured to be capable of exchanging various kinds of information with each other through radio communication between the vehicle-side radio communication unit 14 and the reference-station-side radio communication unit 41. The radio communication terminal 2 and the reference station 4 are configured to be capable of exchanging various kinds of information with each other via the tractor 1. Alternatively, the radio communication terminal 2 and the reference station 4 may be configured to be capable of directly exchanging various kinds of information with each other not via the tractor 1 but through radio communication between the terminal-side radio communication unit 21 and the reference-station-side radio communication unit 41. These radio communication units may perform radio communication therebetween over a common frequency band or different frequency bands.

As illustrated in FIG. 2, the tractor 1 includes a positioning antenna 11, a vehicle-side control unit 12, a position information obtaining unit 13, the vehicle-side radio communication unit 14, and a memory unit (not illustrated), for example. The vehicle-side control unit 12 is configured to enable autonomous travel of the tractor 1 by controlling various devices included in the tractor 1, such as a speed governor, a transmission device, and a steering device (each not illustrated), while obtaining the current position information on itself (the current position of the tractor 1) via the position information obtaining unit 13. In addition, the tractor 1 includes an inertial measurement unit (not illustrated) having a three-axis gyro sensor, a three-direction acceleration sensor, and/or the like. With this, the vehicle-side control unit 12 is configured to be capable of detecting the posture of the tractor 1, the azimuth of the traveling direction of the tractor 1, and/or the like based on the measurement information given by the inertial measurement unit.

As illustrated in FIG. 1, the positioning antenna 11 is configured to receive a signal from a positioning satellite 3 included in a satellite positioning system (GNSS), for example. The positioning antenna 11 is disposed on the top face of the roof provided on the cabin of the tractor 1, for example.

A positioning method involving use of the positioning system may be a positioning method of obtaining the current position of the tractor 1 after correcting satellite positioning information on the tractor 1 (mobile station) based on positioning correction information supplied from the reference station 4 installed at a predefined reference point, as illustrated in FIG. 1. For instance, any of various positioning methods such as differential GPS positioning (DGPS) and real time kinematic positioning (RKT positioning) may be adopted. Alternatively, the positioning method may be independent positioning that does not involve use of the reference station 4.

The present embodiment adopts RTK positioning, for example. Thus, as illustrated in FIGS. 1 and 2, the tractor 1, which is the mobile station, includes the positioning antenna 11, and the reference station 4 is used. The position information on the reference point, at which the reference station 4 is installed, is preliminarily set and grasped. For example, the reference station 4 is positioned at a place (reference point) where the reference station 4 does not interfere with traveling of the tractor 1, e.g., an area surrounding the field. The reference station 4 includes the reference-station-side radio communication unit 41 and a reference-station positioning antenna 42.

In the RTK positioning, both of the reference station 4 installed at the reference point and the positioning antenna 11 of the tractor 1, which is the target mobile station whose position information is to be obtained, measure the phases of the carrier waves (satellite positioning information) from the positioning satellite 3. Every time the reference station 4 obtains satellite positioning information from the positioning satellite 3 or every time a preset period has elapsed, the reference station 4 generates positioning correction information including, e.g., the satellite positioning information thus obtained and the position information on the reference point. Then, the reference station 4 transmits, via the reference-station-side radio communication unit 41, the positioning correction information to the vehicle-side radio communication unit 14 of the tractor 1. The position information obtaining unit 13 of the tractor 1 corrects the satellite positioning information obtained by the positioning antenna 11 based on the positioning correction information supplied from the reference station 4, so as to yield the current position information on the tractor 1. As the current position information on the tractor 1, the position information obtaining unit 13 obtains latitude/longitude information, for example.

The radio communication terminal 2 is a tablet personal computer with a touch panel, for example. Various kinds of information can be displayed on the touch panel. In addition, by operating the touch panel, it is possible to enter various kinds of information. The radio communication terminal 2 is usable either in a state where the user outside the tractor 1 carries the radio communication terminal 2 or in a state where the radio communication terminal 2 is attached to, e.g., the side of the driver seat of the tractor 1.

As illustrated in FIG. 2, the radio communication terminal 2 includes the terminal-side radio communication unit 21, a display control unit 22, a recording control unit 23, a route generating unit 24, a region shape determination unit 25, and a display unit 26 (touch panel), for example. The display control unit 22 is configured to display various screens on a display screen of the display unit 26. In the following description, in a case where the display control unit 22 displays a certain screen, this means that the display control unit 22 displays the certain screen on the display unit 26, unless otherwise stated. The route generating unit 24 is configured to generate a travel route along which the tractor 1 performs autonomous travel. The radio communication terminal 2 includes a memory unit (not illustrated), in which various kinds of information such as information registered by the user is stored.

The tractor 1 is caused to perform autonomous travel in the following manner. First, before autonomous travel is started, the user operates the radio communication terminal 2 to register field information on fields H, such as the shapes of the fields H where the tractor 1 is caused to perform autonomous travel (see FIG. 3, the field H corresponds to a specific region). The route generating unit 24 generates travel routes P (see FIG. 6) for the fields H thus registered. Then, the user operates the radio communication terminal 2 to select a field H to perform work this time. Thereafter, among the travel routes P having been generated for the field H thus selected, the user selects a travel route P to perform autonomous travel this time. Upon satisfaction of an autonomous travel initiation condition after the selection of the field H and the travel route P, it becomes possible to give an instruction to start autonomous travel with the radio communication terminal 2. The user can operate the radio communication terminal 2 to give the instruction to start autonomous travel to the tractor 1, so that the tractor 1 starts autonomous travel.

Since the travel route P is generated by the route generating unit 24 of the radio communication terminal 2, the radio communication terminal 2 needs to transmit route information on the travel route P to the tractor 1. Thus, before and/or after start of autonomous travel, the radio communication terminal 2 transmits the route information to the tractor 1 at a predetermined timing. With this, the vehicle-side control unit 12 causes the tractor 1 to perform autonomous travel along the travel route P based on the route information transmitted from the radio communication terminal 2, while obtaining the current position information on the tractor 1 via the position information obtaining unit 13. The current position information on the tractor 1 obtained by the position information obtaining unit 13 is transmitted from the tractor 1 to the radio communication terminal 2 in real time (e.g., in periods of several seconds) not only before but also after the start of autonomous travel. Consequently, the current position T (see FIG. 8) of the tractor 1 can be displayed on the display unit 26 of the radio communication terminal 2.

With reference to FIGS. 3 to 12, the following will describe how the display control unit 22 of the radio communication terminal 2 controls the display screen when the tractor 1 is caused to perform autonomous travel. FIGS. 3 to 12 each illustrate a display screen displayed on the display unit 26 of the radio communication terminal 2.

Figure 3:
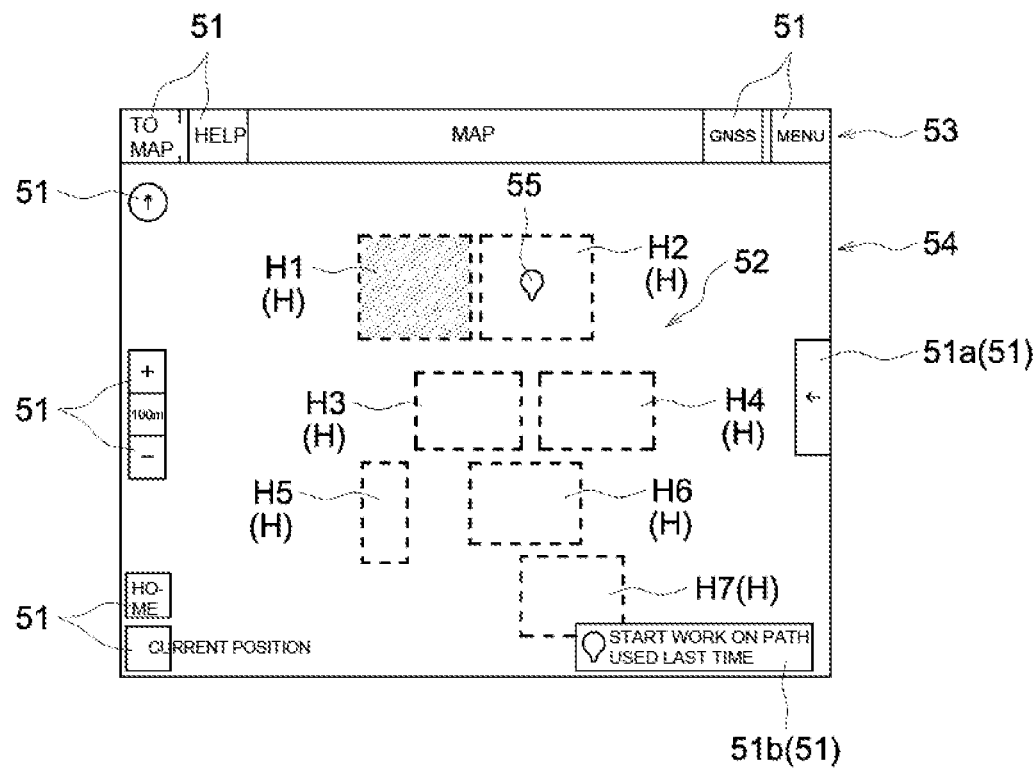
FIG. 3 is a view illustrating a top screen displayed on a display unit of a radio communication terminal.

In response to turning-on of the radio communication terminal 2, the display control unit 22 displays a splash screen, a disclaimer screen, and/or the like, and then displays a top screen illustrated in FIG. 3. The top screen illustrated in FIG. 3 is divided into an upper display region 53, which is located close to the upper edge of the screen, and a lower display region 54, which is located under the upper display region 53. The upper display region 53 is a display screen common to various screens (FIGS. 4 to 12) that are displayed after the top screen. The upper display region 53 is a fixed display region displaying a content that will not be changed. Meanwhile, the lower display region 54 is a non-fixed display region in which various display screens are displayed in response to user's selection of operation sections 51.

On the top screen illustrated in FIG. 3, the display control unit 22 displays, in the lower display region 54, a plurality of operation sections 51 (various icons in FIG. 3) selectable by the user and a map image 52. The display control unit 22 allows a transition to another screen (see, e.g., FIG. 4) in response to selection of a single operation section 51 from among the plurality of operation sections 51.

In the center of the screen of the lower display region 54, the map image 52 including fields H1 to H7 having been registered is displayed. The display control unit 22 displays the map image 52 at a fixed display magnification (this corresponds to a third display state). In addition, the display control unit 22 displays the map image 52 such that the shapes of the fields H1 and H7 are identifiable on the map image 52. In the example illustrated in FIG. 3, the fields H1 to H7 on the top screen are each shaped in a quadrangle. At the time of the initial launch of the system when no field H has been registered, the map image 52 is displayed in such a manner that the map image 52 is centered on a certain position having been set in advance.

The display control unit 22 displays the map image 52 with the center of the map image 52 being located at a similar position to that of the map image displayed on the display screen the last time. When an operation section 51 indicated by "CURRENT POSITION" is operated, the display control unit 22 displays the map image 52 such that the map image 52 is centered on the current position of the tractor 1.

The display control unit 22 displays the map image 52 such that a previous work position 55, which is related to the position of the tractor 1 during autonomous travel performed the last time, is identifiable. The previous work position 55 is indicated by a predetermined mark (pin), which is located at the center of the field H2 where the tractor 1 performed autonomous travel the last time. The display position of the previous work position 55 only needs to show the field H where autonomous travel was performed the last time. The previous work position 55 may alternatively be indicated at a position at which the work for registering the field H was started or at the entrance to the field H for the tractor 1, for example. Upon completion of the work in the field H, the display control unit 22 displays the previous work position 55 at the center of the field H. This applies not only to a case where the last autonomous travel is ended but also to a case where the last autonomous travel is ended on the halfway of the work in the field H.

In the lower display region 54, a field-list-display operation section 51*a* (the icon indicated by "<-" (left arrow) in FIG. 3), a previous-work operation section 51*b* (the icon indicated by the phrase "START WORK ON PATH USED LAST TIME" in FIG. 3), and other operation sections 51 are displayed in such a manner that these operation sections surround the map image 52 except for an upper portion of the map image 52.

In the upper display region 53, operation sections 51 indicated by "TO MAP" and "HELP" are displayed close to the left edge, operation sections 51 indicated by "GNSS" and "MENU" are displayed close to the right edge, and a display content indicative of a currently displayed screen is displayed in the center. The operation section 51 indicated by "TO MAP" is an operation section used to display the map image 52. The operation section 51 indicated by "GNSS" is an operation section used to display detail information on the satellite positioning system and the like, such as a latitude, a longitude, the state of GNSS, the number of positioning satellites 3 from which satellite positioning information is obtained, the serial number of the reference station 4, and/or the remaining level of the battery of the base station 4. The operation section 51 indicated by "MENU" is an operation section to be operated to register a field H and/or to generate a travel route P through the route generating unit 24, for example.

Figure 4:
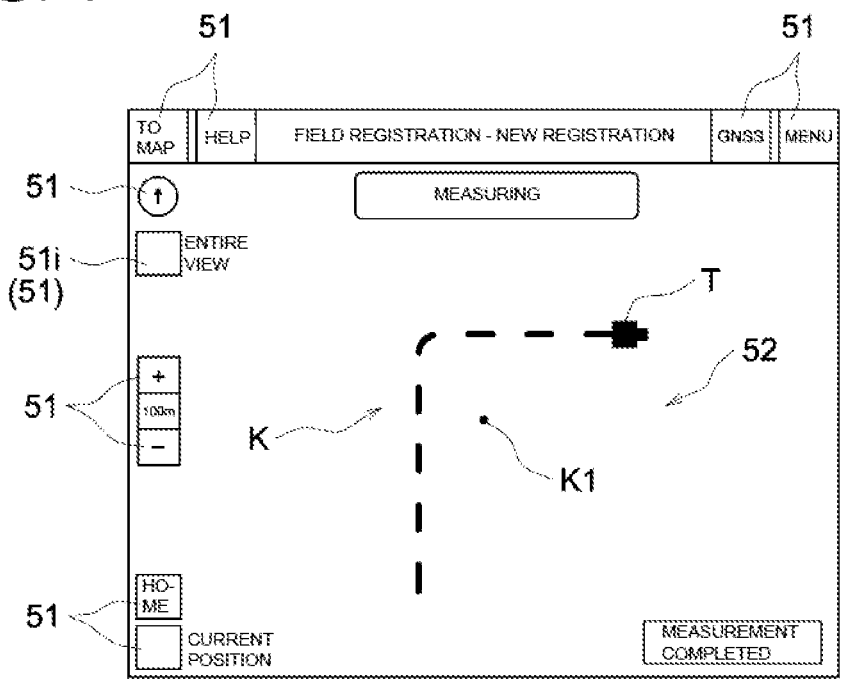
FIG. 4 is a view illustrating a field registration screen displayed on the display unit of the radio communication terminal.

Now, with reference to FIG. 4, the following describes a field registration screen used to register a field H (corresponding to a specific region). For registration of a field H, it is necessary to determine the shape of the field H. Thus, as illustrated in FIG. 2, the radio communication terminal 2 includes the region shape determination unit 25 for determining the shape of the field H. According to various conditions entered, the route generating unit 24 generates travel routes P (paths) for the field H that has been determined by the region shape determination unit 25.

In order to register a field H, the user causes the tractor 1 to travel along the inner side of the outer periphery of the field H to obtain the position information on the tractor 1 via the position information obtaining unit 13 during the traveling. The position information obtaining unit 13 obtains the current position information on the tractor 1 based on the positioning correction information supplied from the reference station 4. The tractor 1 transmits the current position information to the radio communication terminal 2 in real time (e.g., in periods of several seconds). Based on the current position information on the tractor 1 supplied in real time, the display control unit 22 displays a travel trajectory K of the tractor 1 on the field registration screen illustrated in FIG. 4. The travel trajectory K of the tractor 1, which indicates the shape of the field H, can be obtained in this manner. Based on the travel trajectory K of the tractor 1, the region shape determination unit 25 determines the shape of the field H. For example, a quadrangular travel trajectory K may be obtained as the travel trajectory K of the tractor 1 obtained as a result of the tractor 1's traveling along the inner side of the outer periphery of the field H. In such a case, as shown in the top screen in FIG. 3, the region shape determination unit 25 determines the shapes of the fields H1 to H7 as quadrangles.

On the field registration screen illustrated in FIG. 4, the display control unit 22 displays, on the map image 52, a travel trajectory K of the tractor 1 obtained before the shape of the field H is determined by the region shape determination unit 25 (this corresponds to a second display state). Then, the display control unit 22 displays the travel trajectory K of the tractor 1 until the shape of the field H is determined by the region shape determination unit 25.

On the field registration screen illustrated in FIG. 4, the display control unit 22 controls the display magnification of the map image 52 based on the travel trajectory K of the tractor 1. The display control unit 22 controls the display magnification such that the travel trajectory K of the tractor 1 is displayed entirely, for example. In addition, the display control unit 22 displays the map image 52 such that the display screen is centered on the centroid K1 of the travel trajectory K of the tractor 1.

Referring back to the top screen illustrated in FIG. 3, the following gives an additional description of a display mode in which the display control unit 22 displays a field H having been registered. As illustrated in FIG. 4, positioning correction information supplied from a reference station 4 (corresponding to a second reference station) is used to obtain position information on the tractor 1 in order to register a field H. Positioning correction information supplied from a reference station 4 (corresponding to a first reference station) is used also to obtain the current position information on the tractor 1. Here, the number of reference stations 4 is two or more, and the two or more reference stations 4 are positioned at different locations. Thus, merely from simple display of the field H, it is impossible to see if the reference station 4 having been used to register the field H (corresponding to the second reference station) and the reference station 4 used to obtain the current position of the tractor 1 (corresponding to the first reference station) are identical to each other or different from each other.

In view of this, the display control unit 22 displays the field H having been registered (corresponding to a specific region indication section) in a display mode that varies between a case where the reference station 4 having been used to register the field H and the reference station 4 used to obtain the current position of the tractor 1 are identical to each other and a case where the reference station 4 having been used to register the field H and the reference station 4 used to obtain the current position of the tractor 1 are not identical to each other. As illustrated in FIG. 3, the field H1, for which the reference station 4 having been used to register the field H and the reference station 4 used to obtain the current position of the tractor 1 are identical to each other, is displayed in gray. Meanwhile, the fields H2 to H7, for which the reference station 4 having been used to register the field H and the reference station 4 used to obtain the current position of the tractor 1 are not identical to each other, are displayed in white. Thus, the display mode is varied by use of different colors for displaying the fields. The present invention is not limited to the display mode involving use of different colors. The display mode may be selected from various display modes, examples of which encompass a display mode in which the field H1, for which the reference stations 4 used are identical to each other, is displayed with blinking and the fields H2 to H7, for which the reference stations 4 used are not identical to each other, are displayed with lighting.

Figure 5:
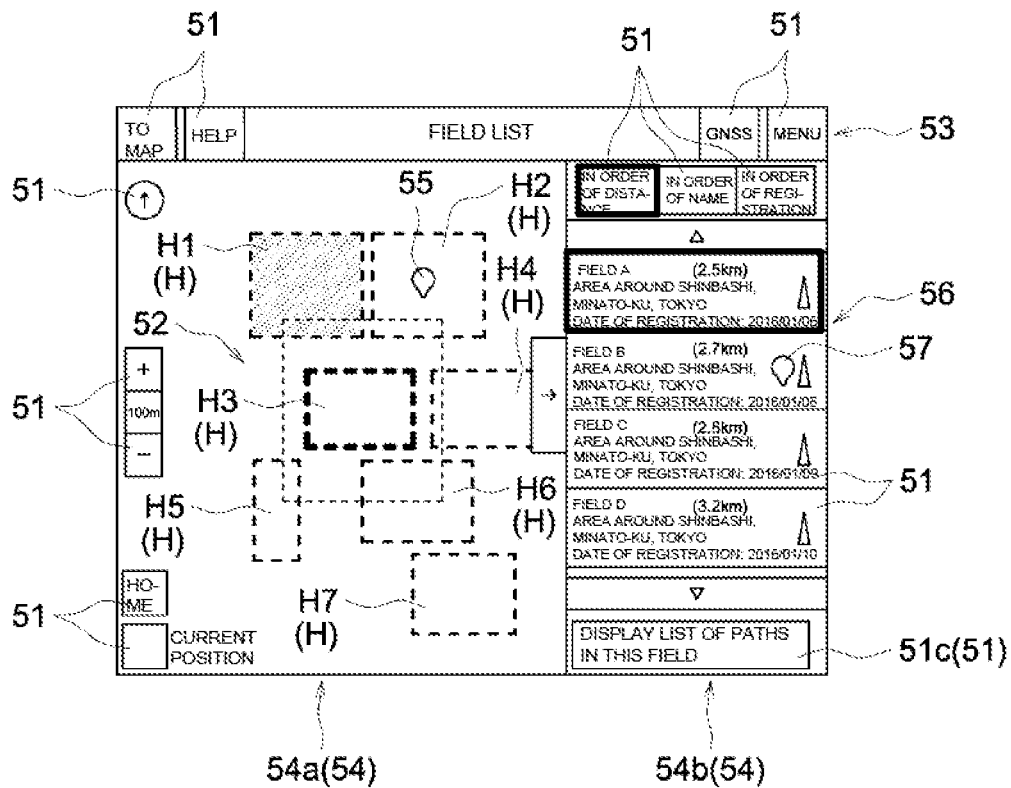
FIG. 5 is a view illustrating a field list screen displayed on the display unit of the radio communication terminal.

When the user selects the field-list-display operation section 51a (the icon indicated by "<-" (left arrow) in FIG. 3) on the top screen illustrated in FIG. 3, the display control unit 22 causes a transition from the top screen illustrated in FIG. 3 to the field list screen illustrated in FIG. 5.

On the field list screen illustrated in FIG. 5, the lower display region 54 is divided into a lower left-side display region 54a and a lower right-side display region 54b. Displayed on the lower left-side display region 54a are the plurality of operation sections 51 and the map image 52, which were displayed on the lower display region 54 of the top screen illustrated in FIG. 3. Displayed on the lower right-side display region 54b are a list 56 of field information stored in the radio communication terminal 2 and a travel-route-list display operation section 51c (the icon indicated by the phrase "DISPLAY LIST OF PATHS IN THIS FIELD" in FIG. 5) used to display a list of travel routes P (paths) having been generated for a certain field H in the past. In response to selection of any of operation sections 51 indicated by, e.g., "IN ORDER OF DISTANCE", "IN ORDER OF NAME", and "IN ORDER OF REGISTRATION", the list 56 of the field information can display the information in the order defined by the selection. In addition, the list 56 of the field information displays, as the field information on the field H, a distance from the current position of the tractor 1 to the field H, the date of registration of the field H in the radio communication terminal 2, the field position information, and/or the like. In addition, the list 56 of the field information is displayed with a previous field information 57 (pin), which indicates, by a predetermined mark, the field H where the tractor 1 performed autonomous travel the last time.

On the field list screen illustrated in FIG. 5, the display control unit 22 can display the list 56 of the field information such that the field information on each field H is displayed in a display mode that varies between a case where the reference station 4 having been used to register the field H and the reference station 4 used to obtain the current position of the tractor 1 are identical to each other and a case where the reference station 4 having been used to register the field H and the reference station 4 used to obtain the current position of the tractor 1 are not identical to each other. Although not illustrated, the display mode may be varied by, e.g., use of a different color for displaying the portion indicated by "Δ" (triangle) in the column for displaying the field information. For example, for field information for which the reference station 4 having been used to register the field H and the reference station 4 used to obtain the current position of the tractor 1 are identical to each other, the portion indicated by "Δ" (triangle) may be displayed in red. Meanwhile, for field information for which the reference station 4 having been used to register the field H and the reference station 4 used to obtain the current position of the tractor 1 are not identical to each other, the portion indicated by "Δ" (triangle) may be displayed in while. Alternatively, not only the portion indicated by "Δ" (triangle) but also the entire column for displaying the field information may be displayed in a different color. Namely, a portion to be varied in the display mode can be changed as appropriate. The display mode is not limited to the one involving use of different colors. Alternatively, the display mode may be selected from various other display modes, examples of which encompass the one involving use of different illumination patterns, such as lighting and blinking. Further alternatively, "Δ" (triangle) may not be displayed in a case where the reference station 4 having been used to register the field H and the reference station 4 used to obtain the current position of the tractor 1 are not identical to each other, and "Δ" (triangle) may be displayed only in a case where the reference station 4 having been used to register the field H and the reference station 4 used to obtain the current position of the tractor 1 are identical to each other.

When the user selects a certain field H on the field list screen illustrated in FIG. 5 (e.g., when the user selects one of the columns for displaying the field information), the display control unit 22 displays the selected field H (H3 in FIG. 5) with, e.g., a bold line of a different color (e.g., a red bold line) surrounding the selected field H so that the selected field H can be discriminated from the other fields H. In addition, the display control unit 22 displays the operation section 51 having been operated for the selection (the icon indicated by "IN ORDER OF DISTANCE" in FIG. 5) with, e.g., a bold line of a different color (e.g., a red bold line) surrounding the operation section 51 so that this operation section 51 can be discriminated from the other operation sections 51. At this time, the display control unit 22 displays the fields H1 to H7 in such a manner that any of the fields H1 to H7 is selectable. Namely, among the fields H1 to H7, not only the field H1, for which the reference station 4 having been used to register the field H and the reference station 4 used to obtain the current position of the tractor 1 are identical to each other, but also any of the fields H2 to H7, for which the reference station 4 having been used to register the field H and the reference station 4 used to obtain the current position of the tractor 1 are not identical to each other, is selectable by the user.

Figure 6:
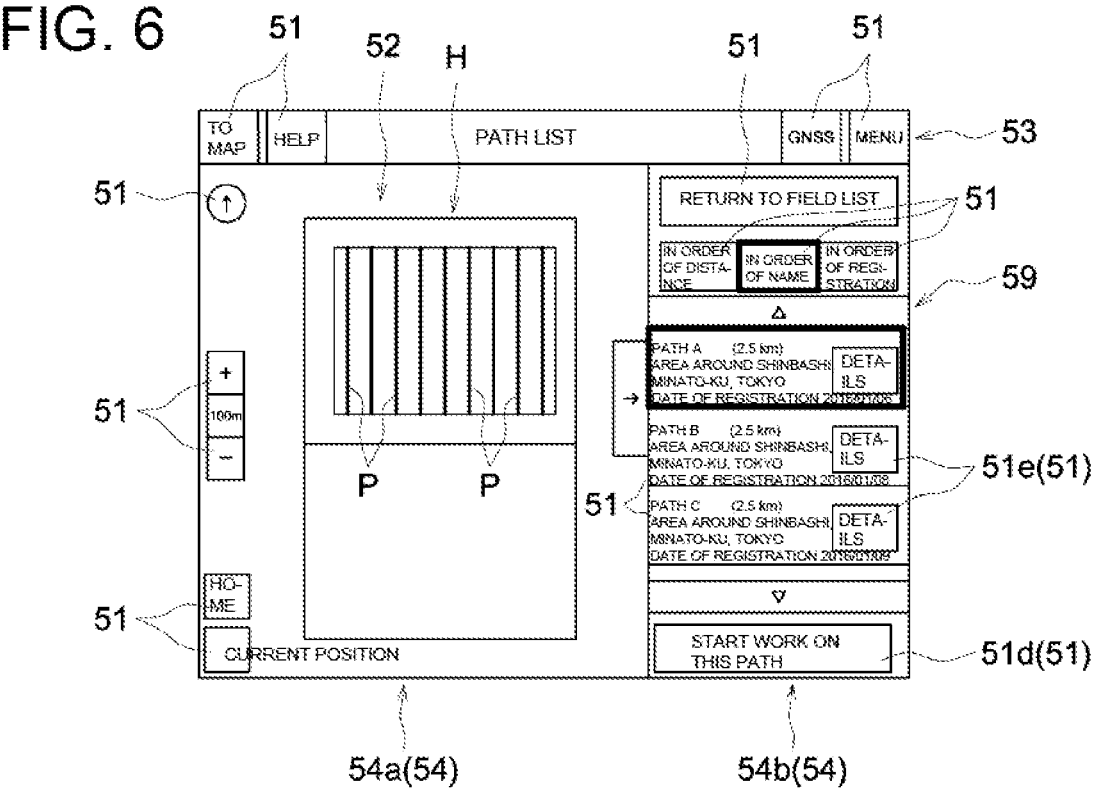
FIG. 6 is a view illustrating a path list screen displayed on the display unit of the radio communication terminal.

When the user selects the travel-route-list display operation section 51c on the field list screen illustrated in FIG. 5 in a state where the certain field H is selected by the user, the display control unit 22 causes a transition from the field list screen illustrated in FIG. 5 to the path list screen illustrated in FIG. 6.

On the path list screen illustrated in FIG. 6, the lower left-side display region 54a displays a map image 52 including a magnified view of the selected field H, and the lower right-side display region 54b displays a list 59 of path information generated in the past (information on travel routes) and a path transfer operation section 51d (the icon indicated by the phrase "START WORK ON THIS PATH" in FIG. 6) used to transfer, to the tractor 1, information on a selected path (information on a travel route).

On the map image 52 including the magnified view of the field H, the travel routes P generated by the route generating unit 24 are displayed. In the example illustrated in FIG. 6, the travel routes P each being in a linear shape are displayed such that the travel routes P are arranged at intervals in a left-right direction.

When the user selects a desired one of the operation sections 51 indicated by, e.g., "IN ORDER OF DISTANCE", "IN ORDER OF NAME", and "IN ORDER OF REGISTRATION", the list 59 of the path information can display the pieces of path information having been sorted in the order defined by the selection. Displayed as the path information are a distance from the current position of the tractor 1 to the start position of the path, the date of registration in the radio communication terminal 2, information on the start position of the path, and/or the like. In addition, the list 59 of the path information displays a path-detail display operation section 51e (the icon indicated by "DETAILS" in FIG. 6) used to display detail information of the path information. Furthermore, the list 59 of the path information displays the path information having been selected (path A in FIG. 6) and the operation section 51 having been used for the selection (the icon indicated by "IN ORDER OF NAME" in FIG. 6) with, e.g., bold lines of a different color (e.g., red bold lines) surrounding the selected path information and operation section 51 so that the selected path information and operation section 51 can be discriminated from the other path information and operation sections 51.

Figure 7:
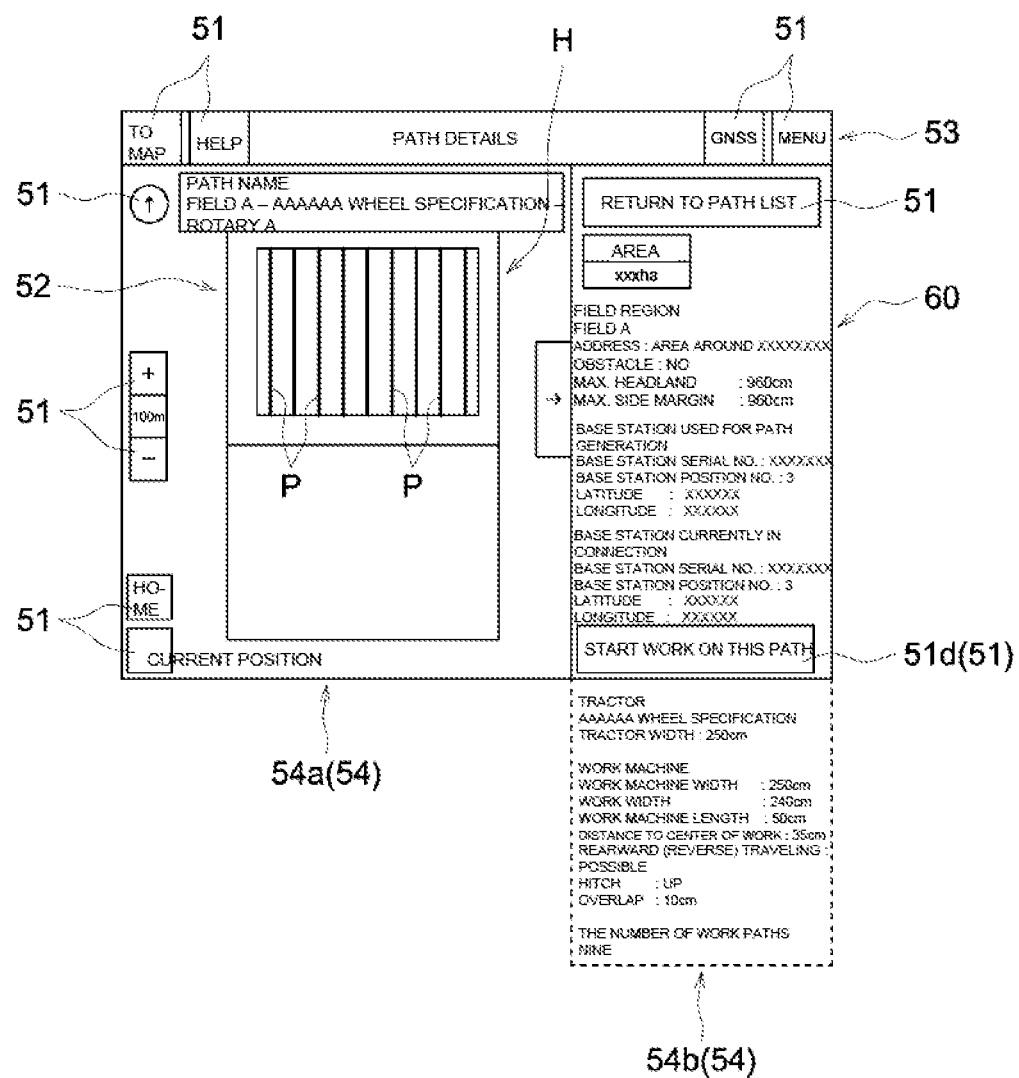
FIG. 7 is a view illustrating a path detail screen displayed on the display unit of the radio communication terminal.

When the user selects the path-detail display operation section 51e on the path list screen illustrated in FIG. 6 in a state where a certain path is selected by the user, the display control unit 22 causes a transition from the path list screen illustrated in FIG. 6 to the path detail screen illustrated in FIG. 7.

The path detail screen illustrated in FIG. 7 and the path list screen illustrated in FIG. 6 are different from each other only in the display content of the lower right-side display region 54b. On the lower right-side display region 54b of the path detail screen illustrated in FIG. 7, path detail information 60 is displayed. Displayed as the path detail information 60 are the area of the field, the presence or absence of an obstacle, the width of a non-work region (e.g., a headland) located in the surrounding area of a work region where paths (travel routes) are generated, information on the reference station used for the path generation, which is related to the reference station 4 (corresponding to the second reference station) having been used at the time of path generation (at the time of registration of the field), information on the reference station currently in connection, which is related to the reference station 4 (corresponding to the first reference station) with which the tractor 1 is currently in communication, tractor information, information on a work machine attached to the tractor 1, the number of paths (travel routes), and/or the like.

As the path detail information 60, the information on the reference station used for the path generation, which is related to the reference station 4 (corresponding to the second reference station) having been used at the time of path generation (at the time of registration of the field), and the information on the reference station currently in connection, which is related to the reference station 4 (corresponding to the first reference station) with which the tractor 1 is currently in communication, are displayed. Namely, identification information on the reference station 4 (corresponding to the second reference station) used at the time of path generation (at the time of registration of the field) and identification information on the reference station 4 (corresponding to the first reference station) with which the tractor 1 is currently in communication are displayed. With this, for the field H selected by the user, it is possible to see whether or not the reference station 4 having been used to register the field H and the reference station 4 used to obtain the current position of the tractor 1 are identical to each other.

Here, in a case where the reference station 4 having been used to register the field H and the reference station 4 used to obtain the current position of the tractor 1 are not identical to each other, the reference stations 4 from which the pieces of positioning correction information are obtained are different from each other, and therefore a deviation may potentially occur between the current position T of the tractor 1 displayed on the map image 52 and the current position of the tractor 1 actually obtained by the position information obtaining unit 13. In order to deal with this, in the case where the reference station 4 having been used to register the field H and the reference station 4 used to obtain the current position of the tractor 1 are not identical to each other, the display control unit 22 makes the path transfer operation section 51d inactive to inhibit selection of the path transfer operation section 51d on the path list screen illustrated in FIG. 6 or the path detail screen illustrated in FIG. 7. In this manner, in the state where the reference station 4 having been used to register the field H and the reference station 4 used to obtain the current position of the tractor 1 are not identical to each other, start of autonomous travel is inhibited. The present invention is not limited to the configuration in which the path transfer operation section 51d is made inactive. Alternatively, in the case where the reference station 4 having been used to register the field H and the reference station 4 used to obtain the current position of the tractor 1 are not identical to each other, the display control unit 22 may hide the path transfer operation section 51d, for example. Further alternatively, in the case where the reference station 4 having been used to register the field H and the reference station 4 used to obtain the current position of the tractor 1 are not identical to each other, the user may select whether to make the path transfer operation section 51d inactive or to hide the path transfer operation section 51d.

In the case where the reference station 4 having been used to register the field H and the reference station 4 used to obtain the current position of the tractor 1 are identical to each other, the display control unit 22 changes the status of the path transfer operation section 51d from inactive to active. The display control unit 22 displays the path transfer operation section 51d with lighting when the path transfer operation section 51d is inactive, and displays the path transfer operation section 51d with blinking when the path transfer operation section 51d is active, for example. In this manner, the display control unit 22 changes the display mode of the path transfer operation section 51d so that the user can see whether the path transfer operation section 51d is inactive or active.

When the user selects the path transfer operation section 51d that is active on the path list screen illustrated in FIG. 6 or the path detail screen illustrated in FIG. 7, the path information (information on the travel routes) is transferred from the radio communication terminal 2 to the tractor 1 via the terminal-side radio communication unit 21 and the vehicle-side radio communication unit 14. At this time, a radio communication check process is performed to check whether or not the path information transmitted via the terminal-side radio communication unit 21 and the vehicle-side radio communication unit 14 matches the path information that the tractor 1 has obtained via the radio communication unit 21 and the vehicle-side radio communication unit 14.

Figure 8:
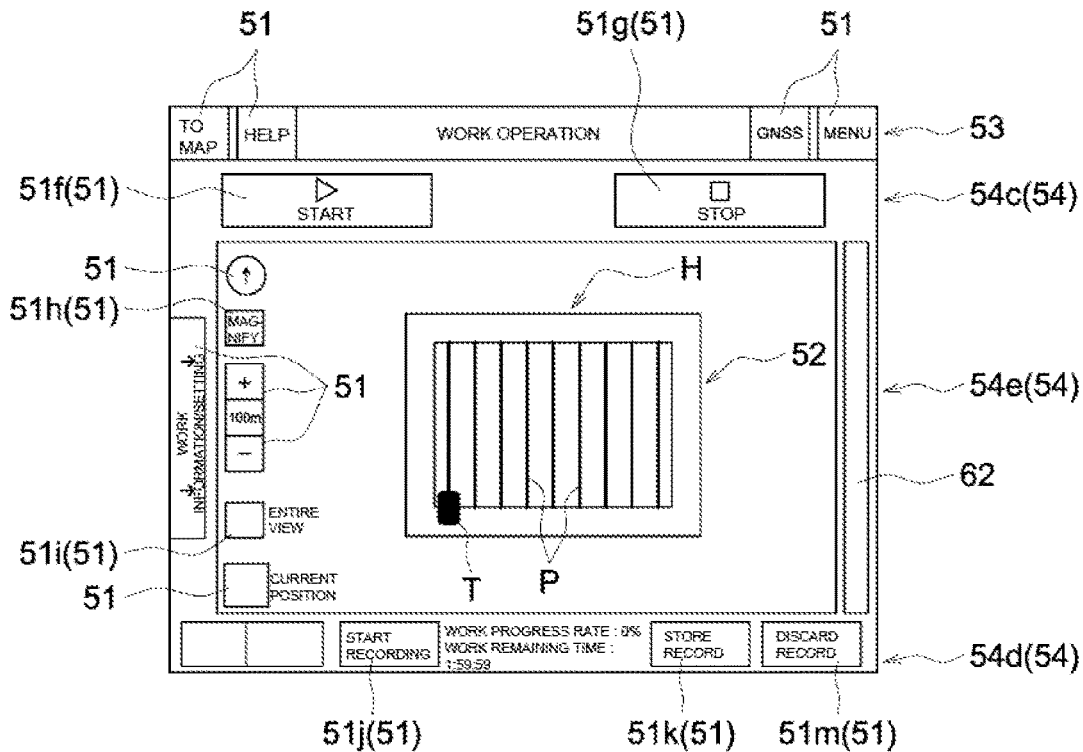
FIG. 8 is a view illustrating a work screen displayed on the display unit of the radio communication terminal.

In a case where the radio communication check process confirms that the path information transmitted via the terminal-side radio communication unit 21 and the vehicle-side radio communication unit 14 matches the path information that the tractor 1 has obtained via the radio communication unit 21 and the vehicle-side radio communication unit 14, the display control unit 22 causes a transition to the work screen illustrated in FIG. 8.

On the work screen illustrated in FIG. 8, the lower display region 54 is vertically divided into three display regions, that is, a lower upper-side display region 54c, which is located close to the upper edge, a lower lower-side display region 54d, which is located close to the lower edge, and a lower middle display region 54e, which is interposed between the lower upper-side display region 54c and the lower lower-side display region 54d. The lower middle display region 54e displays the map image 52 including the magnified view of the field H and the plurality of operation sections 51 displayed in the lower left-side display region 54a on the path list screen illustrated in FIG. 6 or the path detail screen illustrated in FIG. 7. Also, as the operation sections 51, additional operation sections 51 such as a magnifying operation section 51h (the icon indicated by "MAGNIFY" in FIG. 8) and a full-screen operation section 51i (the icon indicated by "ENTIRE VIEW" in FIG. 8) are displayed. The display control unit 22 displays, at a fixed display magnification, the map image 52 including the magnified view of the field H, and displays, on the map image 52 including the magnified view of the field H, the current position T of the tractor 1 (this corresponds to the third display state).

In the lower upper-side display region 54c, a start operation section 51f, with which an instruction to start autonomous travel can be given, is positioned close to the left edge, and a stop operation section 51g, with which an instruction to stop autonomous travel can be given, is positioned close to the right edge. The lower lower-side display region 54d displays the operation sections 51 such as a record start operation section 51j (the icon indicated by "START RECORDING" in FIG. 8), a record instruction operation section 51k (the icon indicated by "STORE RECORD" in FIG. 8), and a record deletion operation section 51m (the icon indicated by "DISCARD RECORD" in FIG. 8) as well as a work progress rate and a work remaining time regarding autonomous travel, for example.

The display control unit 22 makes the start operation section 51f inactive so that the start operation section 51f cannot be selected until various conditions to start autonomous travel are satisfied. Then, upon satisfaction of the various conditions to start autonomous travel, the display control unit 22 makes the start operation section 51f active so that the start operation section 51f can be selected. The display control unit 22 displays the start operation section 51f with lighting when the start operation section 51f is inactive, and displays the start operation section 51f with blinking when the start operation section 51f is active, for example. In this manner, the display control unit 22 changes the display mode of the start operation section 51f so that the user can see whether the start operation section 51f is inactive or active.

Figure 9:
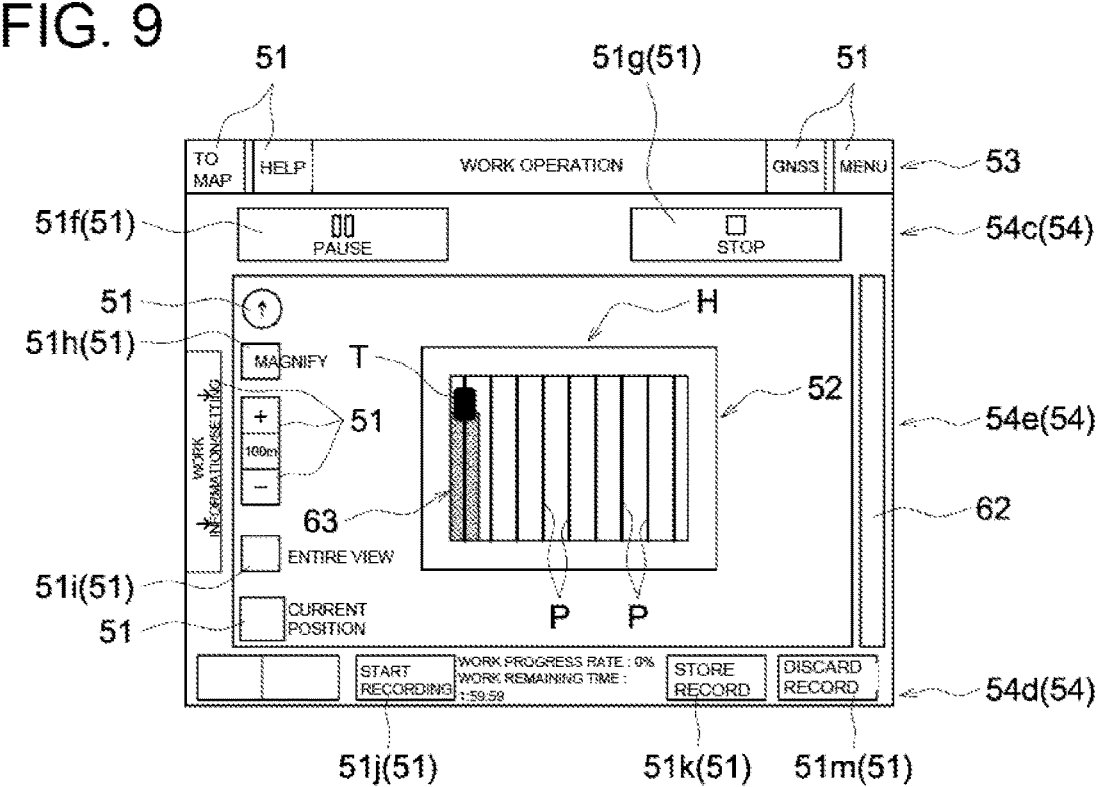
FIG. 9 is a view illustrating a work screen displayed on the display unit of the radio communication terminal.

When the tractor 1 starts autonomous travel in response to an instruction to start autonomous travel given with the start operation section 51f, the display control unit 22 changes the start operation section 51f into a pause operation section 51f, with which an instruction to pause autonomous travel can be given, as illustrated in FIG. 9. In response to selection of the pause operation section 51f, the display control unit 22 changes the start operation section 51f from the pause operation section 51f into its original display mode. In this manner, the display mode of the start operation section 51f can be switched between the display mode for giving an instruction to start autonomous travel and the display mode for giving an instruction to pause the autonomous travel. With the configuration in which the display control unit 22 changes the display mode of the start operation section 51*f* in this manner, a single operation section can function as two operation sections. In addition, with this configuration, the user can easily grasp the work situation during autonomous travel, e.g., see whether autonomous travel has been started or is paused.

On the work screen illustrated in FIG. 8, a distance indicator 62 is positioned close to the right edge of the lower middle display region 54*e*. The distance indicator 62 indicates a distance from the current position of the tractor 1 to an end (headland) of a travel route P on which the tractor 1 is currently performing autonomous travel. The distance indicator 62 is a bar-shaped indicator extending in a top-bottom direction. The display control unit 22 extends a lit area of the distance indicator 62 step by step from the lower end to the upper end of the distance indicator 62 along with traveling of the tractor 1, as the current position of the tractor 1 advances to a position ahead of the end (headland) of the travel route P by a preset distance (e.g., 20 m). Then, when the tractor 1 reaches the end (headland) of the travel route P, the display control unit 22 lights up the whole of the distance indicator 62. Thereafter, when the tractor 1 reaches the start position of a next travel route P, the display control unit 22 resets the distance indicator 62 by turning off the lighting of the whole of the distance indicator 62. The timing to reset the distance indicator 62 by turning off the lighting of the whole of the distance indicator 62 may alternatively be a timing when the tractor 1 reaches the end (headland) of the travel route P. The display control unit 22 controls the illumination state of the distance indicator 62 while the tractor 1 is traveling on the travel route P that has a linear shape as illustrated in FIG. 8. Meanwhile, the display control unit 22 does not control the illumination state of the distance indicator 62 while the tractor 1 is traveling on a route such as a turning travel route, for example.

Figure 10:
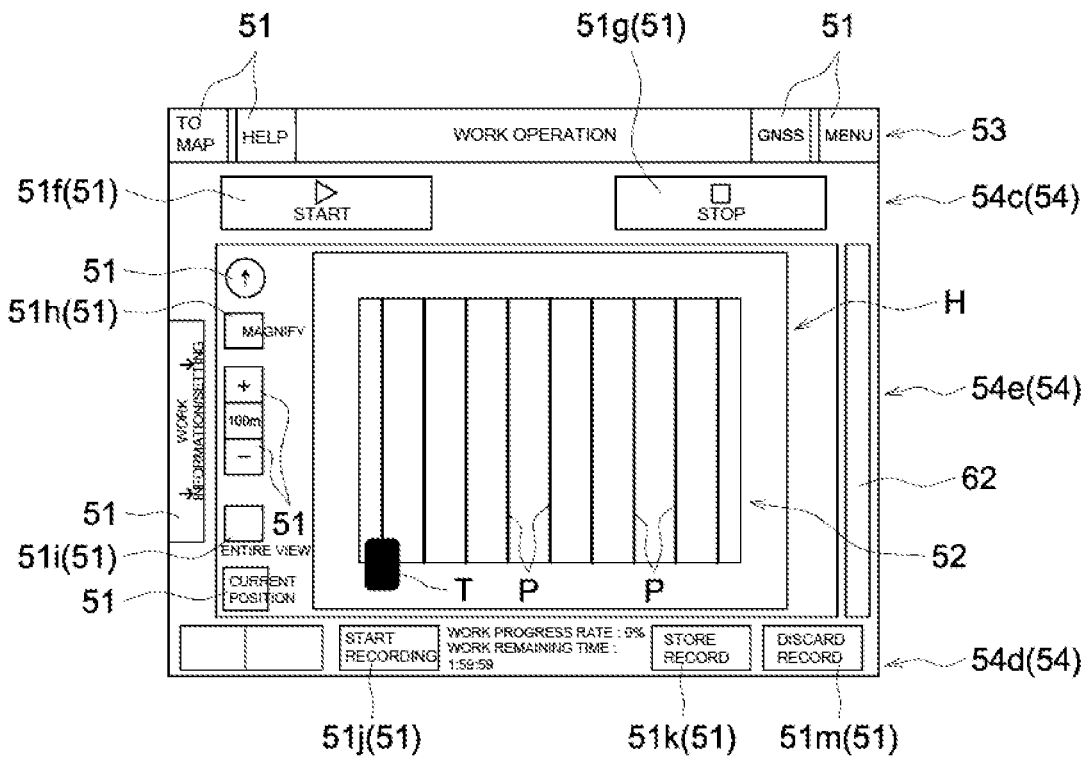
FIG. 10 is a view illustrating a work screen displayed on the display unit of the radio communication terminal.

When the user selects the full-screen operation section 51*i* on the work screen illustrated in FIG. 8 or 9, the display control unit 22 displays, on the whole of the lower middle display region 54*e* except for the operation sections 51 and the distance indicator 62, the map image 52 including the magnified view of the field H, as illustrated in FIG. 10 (this corresponds to the first display state). In this manner, the display control unit 22 controls the display magnification of the map image 52 based on the field H in response to selection of the full-screen operation section 51*i*. Also, the display control unit 22 displays the map image 52 such that the map image 52 is centered on the centroid of the field H. When the full-screen operation section 51*i* is selected by the user, the display control unit 22 maintains the state in which the operation sections 51 arranged near the full-screen operation section 51*i* are displayed.

Figure 11:
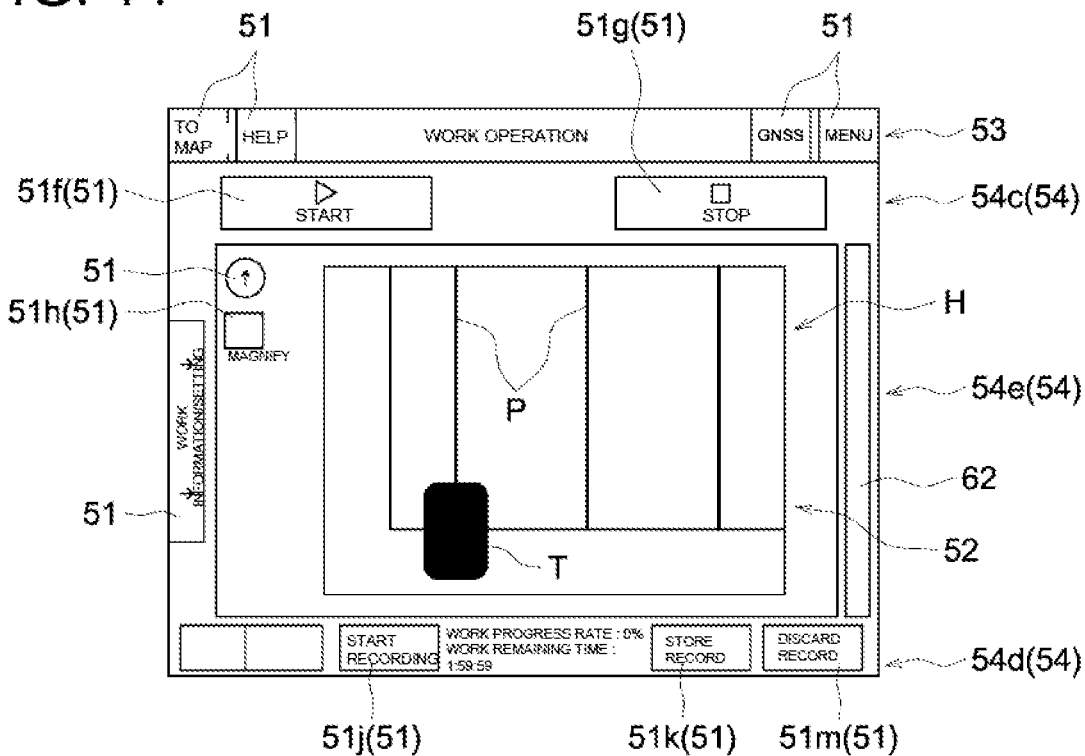
FIG. 11 is a view illustrating a work screen displayed on the display unit of the radio communication terminal.

When the user selects the magnifying operation section 51*h* on the work screen illustrated in FIG. 8 or 9, the display control unit 22 displays, on the whole of the lower middle display region 54*e* except for the operation sections 51 and the distance indicator 62, a map image 52 including a magnified view of a range having been set based on the current position T of the tractor 1 in the field H, as illustrated in FIG. 11. As illustrated in FIG. 11, when the user selects the magnifying operation section 51*h*, the display control unit 22 hides the operation sections 51 arranged near the magnifying operation section 51*h*. In FIG. 11, below the magnifying operation section 51*h*, two operation sections 51 (the icons indicated by "+" and "−" in the drawings), the full-screen operation section 51*i*, a single operation section 51 (the icon indicated by "GNSS position" in the drawings) are arranged in a line in this order from above. However, these five operation sections 51 are hidden.

When the user selects the magnifying operation section 51*h* on the work screen illustrated in FIG. 11, the display control unit 22 causes a transition back to the work screen illustrated in FIG. 8 or 9, so that the operation sections 51 hidden on the screen illustrated in FIG. 11 are displayed. Here, when the user selects the magnifying operation section 51*h* on the work screen illustrated in FIG. 8 or 9, the display control unit 22 stores the display setting on the map image 52 applied at that time. Thus, in response to user's selection of the magnifying operation section 51*h* on the work screen illustrated in FIG. 11, the map image 52 is displayed on the work screen illustrated in FIG. 8 or 9 according to the display setting thus stored. For example, when the user selects the magnifying operation section 51*h* on the work screen illustrated in FIG. 8, the display setting such as the display magnification on the map image 52 applied at that time is stored, and a transition to the work screen illustrated in FIG. 11 takes place. Then, by selecting the magnifying operation section 51*h* on the work screen illustrated in FIG. 11, the user can cause a transition back to the work screen illustrated in FIG. 8, in which the map image 52 is displayed according to the display setting such as the display magnification thus stored.

As illustrated in FIG. 9, during autonomous travel, the display control unit 22 provides a predetermined history indication 63 on the travel route P based on the travel trajectory of the tractor 1 on the travel route P generated in the field H. The history indication 63 is provided so as to correspond to a portion of the travel route P in which portion the tractor 1 has already traveled. The history indication 63 is achieved by a display process of painting out the already-traveled portion with a predetermined color, for example. With this, the user can readily see the portion of the travel route P in which portion the tractor 1 has performed the work by autonomous travel.

The display control unit 22 provides, as the predetermined history indication, the history indication 63 in either of a first history indication mode in which the history indication 63 is provided based on work state information indicating a work state of the tractor 1 and having been obtained from the tractor 1 and a second history indication mode in which the history indication 63 is provided not based on the work state information.

In the first history indication mode, the work state information is generated based on, e.g., the operation state of the work machine attached to the tractor 1, since the vehicle-side control unit 12 of the tractor 1 possesses the information on the operation state of the work machine. The tractor 1 transmits the work state information to the radio communication terminal 2. Thus, the display control unit 22 of the radio communication terminal 2 obtains the work state information as well as the position information on the tractor 1. Consequently, the display control unit 22 can grasp a portion of the travel route P in which portion the tractor 1 is performing the work. According to this, the display control unit 22 provides the history indication 63 for the portion where the tractor 1 has performed the work. As described above, in the first history indication mode, the display control unit 22 automatically provides the history indication 63 based on the position information and the work state information on the tractor 1.

Figure 12:
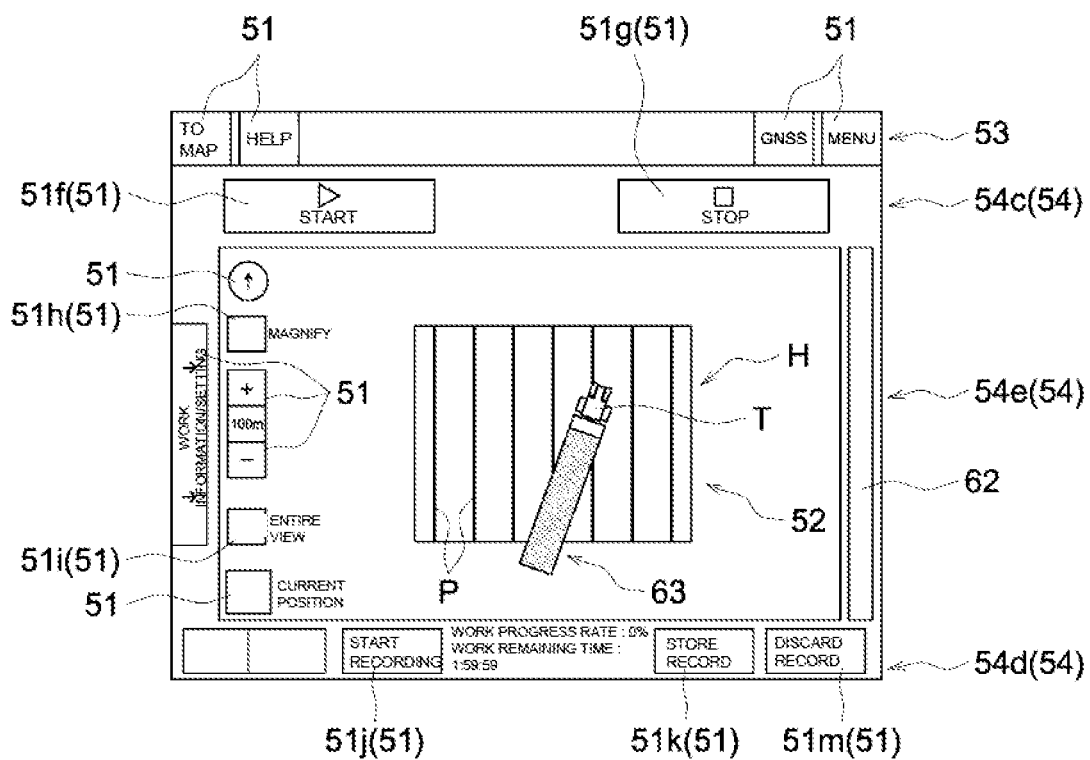
FIG. 12 is a view illustrating a work screen displayed on the display unit of the radio communication terminal.

In the second history indication mode, the display control unit 22 does not automatically provide the history indication 63 based on the position information and the work state information on the tractor 1, but provides the history indication 63 in accordance with user's manual operation, as illustrated in FIG. 12. For example, when the user selects the record start operation section 51*j* to start the history indication 63 and then moves the current position T of the tractor 1 on the screen of the display unit 26, the display control unit 22 provides the history indication 63 so as to correspond to the movement of the current position T of the tractor 1. Thus, for example, even in a case where a work machine from which work state information cannot be obtained is attached to the tractor 1, it is possible to select the second history indication mode to provide the history indication 63 in accordance with user's manual operation.

Although not illustrated, switchover between the first history indication mode and the second history indication mode can be performed with a mode switchover operation section that appears in response to selection of a certain operation section 51. When the first history indication mode is selected with the mode switchover operation section, the display control unit 22 provides the history indication 63 in the first history indication mode. Meanwhile, when the second history indication mode is selected with the mode switchover operation section, the display control unit 22 provides the history indication 63 in the second history indication mode. The record start operation section 51*j* in the first history indication mode selected with the mode switchover operation section and the record start operation section 51*j* in the second history indication mode selected with the mode switchover operation section are displayed in different colors. The display mode of the record start operation section 51*j* is varied in this manner. In addition, in the second history indication mode, the display control unit 22 changes the indication of the record start operation section 51*j* from "START RECORDING" to "PAUSE RECORDING", for example. Thus, the display control unit 22 makes the record start operation section 51*j* serve both as the operation section 51 for starting the history indication 63 and the operation section 51 for pausing the history indication 63 in the second history indication mode.

Here, in the first history indication mode, the display control unit 22 automatically provides the history indication 63 based on the position information and the work state information on the tractor 1. The display control unit 22 can perform the first history indication mode not only when the tractor 1 is caused to perform autonomous travel but also when the tractor 1 is caused to travel in accordance with user's manual operation. In addition, the display control unit 22 provides, for the history indication 63 in the first history indication mode, a display mode that varies between a case where the tractor 1 is caused to perform autonomous travel and a case where the tractor 1 is caused to travel in accordance with user's manual operation. The display mode may be selected from various display modes, examples of which encompass the one involving use of different colors for the painting process and the one involving use of different illumination patterns, such as lighting and blinking, for the painting process.

As with the case of the first history indication mode, the display control unit 22 can perform the second history indication mode not only when the tractor 1 is caused to perform autonomous travel but also when the tractor 1 is caused to travel in accordance with user's manual operation. In addition, the display control unit 22 provides, for the history indication 63 in the second history indication mode, a display mode that varies between a case where the tractor 1 is caused to perform autonomous travel and a case where the tractor 1 is caused to travel in accordance with user's manual operation. The display mode may be selected from various display modes, examples of which encompass the one involving use of different colors for the painting process and the one involving use of different illumination patterns, such as lighting and blinking, for the painting process.

As illustrated in FIG. 2, the radio communication terminal 2 includes the recording control unit 23. When the display control unit 22 performs the history indication 63, the recording control unit 23 records, in the memory unit 27, the history indication 63 displayed by the display control unit 22. The recording control unit 23 is configured to be capable of automatically recording the history indication 63 in the memory unit 27 after a predetermined period of time has elapsed since the history indication 63 is started by the display control unit 22. The recording control unit 23 records, in the memory unit 27, history indications 63 in association with respective fields H in such a manner as to enable identification of the correspondence between the fields H and the history indications 63. The recording control unit 23 records, at any of various timings, the history indication 63 in the memory unit 27 after a predetermined period of time has elapsed after the history indication 63 is started. Examples of the various timings encompass a timing at which the radio communication terminal 2 is powered on, a timing at which the work screen illustrated in FIG. 9 or the like is displayed, and a timing at which a transition from the work screen illustrated in FIG. 9 or the like to another screen (e.g., the top screen illustrated in FIG. 3) takes place.

As described above, the recording control unit 23 can automatically record the history indication 63 in the memory unit 27. In addition, the record instruction operation section 23 can record the history indication 63 in the memory unit 27 in response to user's selection of the record instruction operation section 51*k* on the work screen illustrated in FIG. 9. Thus, at the timing at which the user wishes to record the history indication 63, the recording control unit 23 can record the history indication 63 in the memory unit 27.

When the recording control unit 23 records the history indication 63 in the memory unit 27, the history indication 63 displayed by the display control unit 22 is reset. Then, the display control unit 22 can retrieve the history indication 63 recorded in the memory unit 27 to display the history indication 63 when the field H is displayed.

When the user selects the record deletion operation section 51*m* on the work screen illustrated in FIG. 9, the recording control unit 23 deletes the history indication 63 stored in the memory unit 27. With this, the user can delete the history indication 63 at a timing at which the user wishes to delete the history indication 63.

As described above, the display control unit 22 is configured to be capable of displaying a plurality of screens including a setting screen used to perform a setting on autonomous travel of the tractor 1 (e.g., the top screen illustrated in FIG. 3, the field registration screen illustrated in FIG. 4, the field list screen illustrated in FIG. 5, and the path list screen illustrated in FIG. 6) and the work screen (e.g., the work screens illustrated in FIGS. 8 and 9) via which instructions to start and stop autonomous travel of the tractor 1 can be given.

The tractor 1 can perform autonomous travel in a desired one of a plurality of modes including a normal autonomous travel mode of performing the setting on autonomous travel via the setting screen of the radio communication terminal 2 and allowing the tractor 1 to start autonomous travel in response to an instruction to start autonomous travel given through the work screen and an autonomous travel preparation mode of allowing the tractor 1 to start autonomous travel in response to an instruction to start autonomous travel given through the work screen, without performing the setting on autonomous travel via the setting screen of the radio communication terminal 2.

In order to perform normal work, the tractor 1 is brought into the normal autonomous travel mode. However, during autonomous travel, an abnormality may occur in the control performed by the display control unit 22 of the radio communication terminal 2, and/or radio communication between the tractor 1 and the radio communication terminal 2 may be interrupted, for example. In such a case, the vehicle-side control unit 12 temporarily stops autonomous travel of the tractor 1, and brings the tractor 1 into the autonomous travel preparation mode, from which autonomous travel can be restarted.

While the tractor 1 is in the normal autonomous travel mode, the display control unit 22 displays the setting screen (e.g., the top screen illustrated in FIG. 3) prior to display of the work screen (e.g., the work screens illustrated in FIGS. 8 and 9). Thus, in the normal autonomous travel mode, various settings on autonomous travel are performed via the setting screen, and thereafter the work screen via which an instruction to start autonomous travel of the tractor 1 can be given is displayed.

Meanwhile, while the tractor 1 is in the autonomous travel preparation mode, the display control unit 22 displays the work screen (e.g., the work screens illustrated in FIGS. 8 and 9) without displaying the setting screen (e.g., the top screen illustrated in FIG. 3). Thus, in the autonomous travel preparation mode, it is possible to display the work screen via which an instruction to start autonomous travel of the tractor 1 can be given, without displaying the setting screen. Then, it is possible to start autonomous travel via the work screen. Consequently, autonomous travel can be restarted quickly and smoothly.

The present invention is applicable to various work screen display systems for displaying a display screen on a display unit when a work vehicle is caused to perform autonomous travel.

REFERENCE SIGNS LIST

1, tractor (work vehicle)
2, radio communication terminal
4, reference station
13, position information obtaining unit
22, display control unit
23, recording control unit
25, region shape determination unit
26, display unit
27, memory unit
51*h*, magnifying operation section
51*k*, record instruction operation section
52, map image
63, history indication
H, field (specific region)
K, travel trajectory
K1, centroid of travel trajectory

The invention claimed is:

1. A work screen display system comprising:
a display control unit configured to display a map image on a display unit, wherein:
the display control unit is configured to display registered fields on the map image,
the registered fields are fields for which a driving route for automatically driving a work vehicle can be generated,
the display control unit is configured to display information associated with the registered fields simultaneously with the map image, and
the information associated with the registered fields includes, for each respective registered field of the registered fields, a date on which the respective registered field was registered.

2. The work screen display system according to claim 1, wherein the display control unit is configured to simultaneously display a plurality of registered fields on the map image.

3. The work screen display system according to claim 2, wherein the display control unit is configured to display a registered field in which the work vehicle last worked among the plurality of registered fields in an identifiable manner.

4. The work screen display system according to claim 1, wherein the display control unit is configured to display the shape of a field of the registered fields on the map image in a discernible manner.

5. The work screen display system according to claim 1, wherein the information associated with the registered fields includes, for each respective registered field of the registered fields, a distance from a current position of the work vehicle to the respective registered field.

6. The work screen display system according to claim 1, wherein the display control unit is configured to display a list of the information associated with the registered fields at the same time as the map image.

7. The work screen display system according to claim 6, wherein the display control unit is configured to display, in the information list, the registered field where the work vehicle last worked in an identifiable manner.

8. The work screen display system according to claim 6, wherein the display control unit is configured to display the registered field selected in the information list in an identifiable manner on the map image.

9. The work screen display system according to claim 1, wherein the display control unit is configured to display registered fields on the map image in a display mode that varies based on whether a first reference station that is used to obtain first position information of a work vehicle and a second reference station that is used to obtain second position information of the work vehicle are the same reference station.

10. The work screen display system according to claim 9, wherein a field of the registered fields is registered using the second position information.

11. The work screen display system according to claim 9, wherein the first position information of the work vehicle is associated with a first time subsequent in time to a second time with which the second position information of the work vehicle is associated.

12. The work screen display system according to claim 9, wherein, when the first and second reference stations are the same, the display mode includes displaying the registered fields with a first characteristic, and
when the first and second reference stations are different, the display mode includes displaying the registered fields with a second characteristic different than the first characteristic.

13. The work screen display system according to claim 12, wherein the first characteristic is a first color and the second characteristic is a second color different than the first color.

14. A work screen display system comprising a display control unit configured to:

display a map image on a display unit;
simultaneously display a plurality of registered fields on the map image, wherein the plurality of registered fields are fields for which a driving route for automatically driving a work vehicle can be generated;
display information associated with the plurality of registered fields simultaneously with the map image and while the work vehicle is performing work in the plurality of registered fields; and
display a registered field in which the work vehicle last performed worked among the plurality of registered fields in an identifiable manner.

* * * * *